US009767300B2

(12) United States Patent
Keohane et al.

(10) Patent No.: US 9,767,300 B2
(45) Date of Patent: *Sep. 19, 2017

(54) MANAGING RESTRICTED TAGGED CONTENT ELEMENTS WITHIN A PUBLISHED MESSAGE

(71) Applicant: GLOBALFOUNDRIES Inc., Grand Cayman (KY)

(72) Inventors: Susann M. Keohane, Austin, TX (US); Gerald F. McBrearty, Austin, TX (US); Jessica C. Murillo, Round Rock, TX (US); Johnny M. Shieh, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,426

(22) Filed: Nov. 30, 2015

(65) Prior Publication Data

US 2016/0085983 A1 Mar. 24, 2016

Related U.S. Application Data

(63) Continuation of application No. 14/090,220, filed on Nov. 26, 2013, now Pat. No. 9,336,403.

(51) Int. Cl.
*G06F 21/62* (2013.01)
*H04L 29/06* (2006.01)

(52) U.S. Cl.
CPC ...... *G06F 21/6209* (2013.01); *H04L 63/0428* (2013.01); *H04L 63/102* (2013.01)

(58) Field of Classification Search
CPC ............... G06F 21/6209; H04L 63/102; H04L 63/0428
(Continued)

(56) References Cited

U.S. PATENT DOCUMENTS 6,978,367 B1 12/2005 Hind
2004/0078595 A1 4/2004 Kent et al.
(Continued)

OTHER PUBLICATIONS

Emiliano De Cristofaro et al., 'Hummingbird: Privacy at the time of Twitter', Cryptology ePrint Archive, Report 2011/640, 2011, 23 pages.*

(Continued)

*Primary Examiner* — Shanto M Abedin
(74) *Attorney, Agent, or Firm* — DeLio, Peterson & Curcio, LLC; Kelly M. Nowak

(57) ABSTRACT

A computer encrypts only a restricted tag element from among a plurality of content elements to be electronically published as a message for access by a plurality of users, wherein decryption of the encrypted restricted tag element is limited to a selection of at least one user from among the plurality of users. The computer outputs the plurality of content elements for electronic publication through an interface accessible to the plurality of users, wherein the plurality of users are enabled to access the plurality of content elements of the message published through the interface, wherein only the selection of at least one user is enabled to decrypt the encrypted restricted tag element in the plurality of content elements to access the underlying restricted tag element within the message published through the interface.

16 Claims, 8 Drawing Sheets

(58) Field of Classification Search
USPC .............................. 726/26–30; 715/752, 753
See application file for complete search history.

(56) References Cited

U.S. PATENT DOCUMENTS

| | | | |
|---|---|---|---|
| 2004/0078596 A1 | 4/2004 | Kent et al. | |
| 2009/0019553 A1 | 1/2009 | Narayanaswami | |
| 2010/0191975 A1* | 7/2010 | Chase .................. | G06F 21/6254 |
| | | | 713/176 |
| 2012/0059690 A1 | 3/2012 | Ruckart et al. | |
| 2012/0072419 A1* | 3/2012 | Moganti ........... | G06F 17/30038 |
| | | | 707/737 |
| 2012/0089691 A1* | 4/2012 | Kim ........................ | H04L 51/14 |
| | | | 709/206 |
| 2012/0110458 A1* | 5/2012 | Brown .............. | G06F 17/30575 |
| | | | 715/733 |
| 2012/0303429 A1 | 11/2012 | Nolledo et al. | |
| 2013/0154980 A1* | 6/2013 | Byrnes ...................... | G06F 3/01 |
| | | | 345/173 |
| 2013/0291058 A1* | 10/2013 | Wollenstein ............ | H04L 63/20 |
| | | | 726/1 |
| 2014/0365572 A1* | 12/2014 | Kennon ................. | G06Q 50/01 |
| | | | 709/204 |
| 2015/0150147 A1 | 5/2015 | Keohane et al. | |

OTHER PUBLICATIONS

Mohamed Nabeel et al, Mask: A system for privacy-preserving policy-based access to published content, ACM, 2010.*

Notice of Allowance, mailing date Jan. 13, 2016, U.S. Appl. No. 14/090,220, filed Nov. 26, 2013, In re Keohane, 53 pages.

Randy Baden et al, Persona: An Online Social Network with User-Defined Privacy, ACM 2009, 12 pages.

'Social Media Intelligence', www.punchcomms.com, Punch Communications, Jun. 13, 2013, 1 page.

Indrajeet Singh et al., 'Enabling Private Conversations on Twitter', ACSAC '12 Dec. 3-7, 2012, Orlando, Florida USA, 10 pages.

Office Action, mailing date Jul. 6, 2015, U.S. Appl. No. 14/090,220, filed Nov. 26, 2013, In re Keohane, 48 pages.

Emiliano De Cristofaro et ai, Tweeting with Hummingbird: Privacy in large-Scale Micro-Blogging OSNs, pp. 93-100, IEEE, 2012.

Steve Campbell, How to Encrypt Your Gmail & Facebook Messages, www.makeuseof.com, 2011.

* cited by examiner

MANAGING RESTRICTED TAGGED CONTENT ELEMENTS WITHIN A PUBLISHED MESSAGE

CROSS REFERENCE TO RELATED APPLICATIONS

This application is a continuation of commonly assigned U.S. patent application Ser. No. 14/090,220, filed Nov. 26, 2013, which is hereby incorporated herein by reference.

BACKGROUND

1. Technical Field

This invention relates in general to managing message publication and in particular to managing tagged content within a published message which includes public content elements and one or more restricted tag elements, where access to the one or more restricted tag elements is limited to only a selection of the users allowed to access the published message.

2. Description of the Related Art

Users today can publish new electronic content, instantaneously, to other users around the world by publishing messages through many different message management services such as Twitter®, Facebook®, Instagram®, blog hosts, and others. When generating electronic content, the user may include tags in the content, where the tags may include keywords or terms assigned to the electronic content and published as part of the electronic content. Tags within the content of a published message are searchable.

Over time, the use of a "hashtag", created by placing the number sign symbol (#) in front of a word or phrase, has become a common way to quickly create and denote tags within the content generated by users for publication through message management services. A user may select to place a number sign symbol in front of a word or phrase, as a way of creating a tag with that word or phrase within the displayed content of a message. Published messages are searchable by hashtag, which allows for efficient search and aggregation of published messages containing the same hashtag. In another example, a user may select to place a hashtag symbol in front of other types of content within a published message.

BRIEF SUMMARY

When a message is published through a message management service, a user's access settings may specify the other users who may access the message, for all messages composed under a user account or for each message, on a message by message basis. One limitation of managing access settings for an entire message is that a user may create a message accessible to other users, with multiple content elements to be published, including tagged content elements, and the user may prefer for one or more tagged content elements, such as one or more hashtags, to be accessible to only a selection of the other users allowed to access the published message. In view of the foregoing, there is a need for a method, system, and computer program product for enabling a user to specify, within the content elements of a message to be electronically published, restricted tagged elements that are accessible to only a selection of the other users allowed to access the entire published message.

In one embodiment, a method for managing content publication is directed to encrypting, by at least one computer, only a restricted tag element from among a plurality of content elements to be electronically published as a message for access by a plurality of users, wherein decryption of the encrypted restricted tag element within the message is limited to a selection of at least one user from among the plurality of users. The method is directed to outputting, by the at least one computer, the plurality of content elements for electronic publication through an interface accessible to the plurality of users, wherein the plurality of users are enabled to access the plurality of content elements of the message published through the interface, wherein only the selection of at least one user is enabled to decrypt the encrypted restricted tag element in the plurality of content elements to access the underlying restricted tag element within the message published through the interface.

In another embodiment, a system for managing content publication comprises one or more processors, a memory coupled to at least one of the processors. In addition, the system comprises a set of computer program instructions stored in the memory and executed by at least one of the processors in order to perform the actions of: encrypting only a restricted tag element from among a plurality of content elements to be electronically published as a message for access by a plurality of users, wherein decryption of the encrypted restricted tag element within the message is limited to a selection of at least one user from among the plurality of users and outputting the plurality of content elements for electronic publication through an interface accessible to the plurality of users, wherein the plurality of users are enabled to access the plurality of content elements of the message published through the interface, wherein only the selection of at least one user is enabled to decrypt the encrypted restricted tag element in the plurality of content elements to access the underlying restricted tag element within the message published through the interface.

In another embodiment, a computer program product for managing content publication comprises a computer readable storage medium having program code embodied therewith. The program code is executable by a computer to encrypt, by the computer, only a restricted tag element from among a plurality of content elements to be electronically published as a message for access by a plurality of users, wherein decryption of the encrypted restricted tag element within the message is limited to a selection of at least one user from among the plurality of users. The program code is executable by the computer to output, by the computer, the plurality of content elements for electronic publication through an interface accessible to the plurality of users, wherein the plurality of users are enabled to access the plurality of content elements of the message published through the interface, wherein only the selection of at least one user is enabled to decrypt the encrypted restricted tag element in the plurality of content elements to access the underlying restricted tag element within the message published through the interface.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

As described herein, embodiments of the invention provide a solution for managing restricted metadata tags within an electronically published message.

Figure 1:
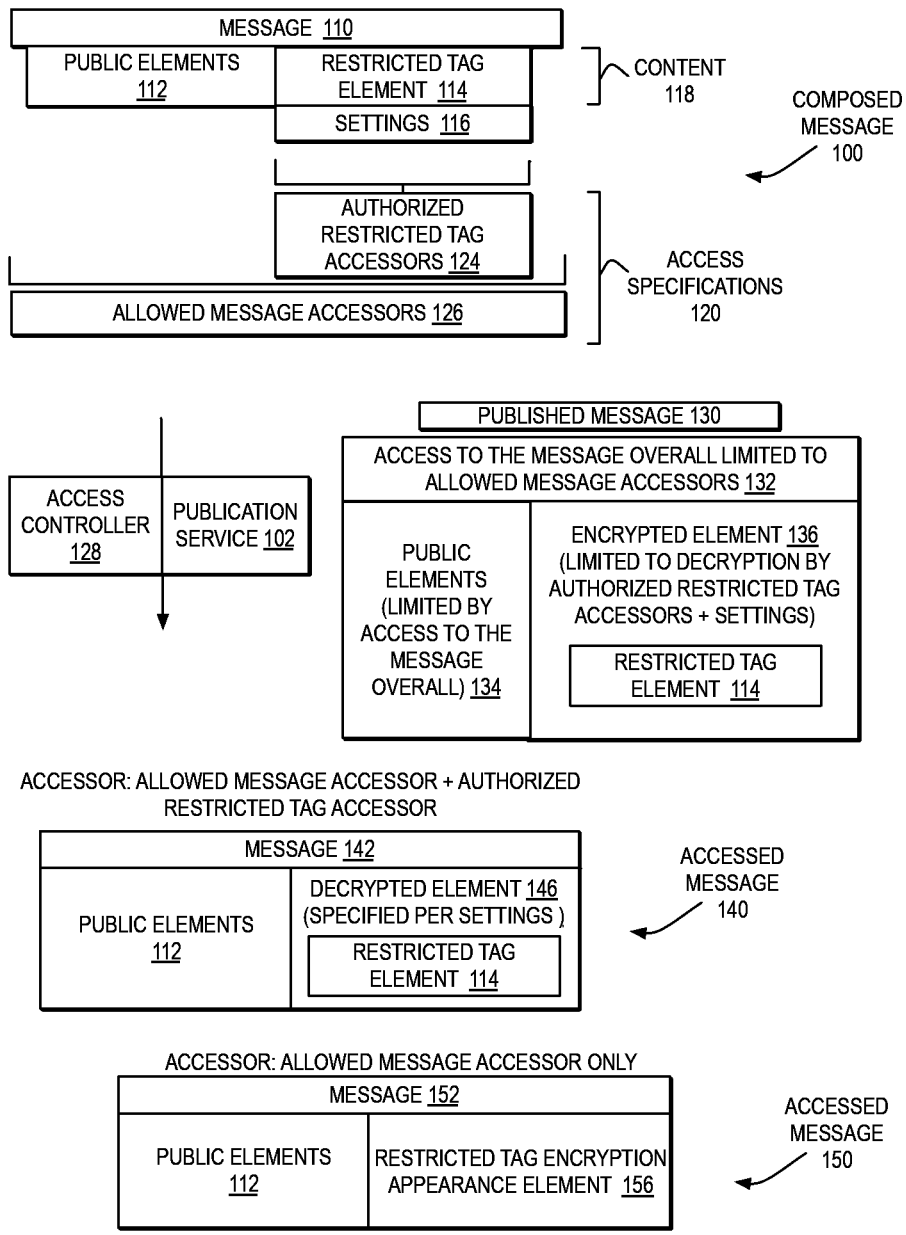
FIG. 1 is a block diagram illustrating one example of a message including multiple content elements, with at least one tag element marked as a restricted tag element, as composed, sent, and accessed.

With reference now to the figures, and in particular with reference now to FIG. 1, a block diagram illustrates one example of a message including multiple content elements, with at least one tag element marked as a restricted tag element, as composed, sent, and accessed.

In the example, a composed message 100 includes a message 110 that has been composed for electronic publication. In the example, message 110 may include content 118, which is the content portion of message 110 to be published, and one or more other types of metadata, which may or may not be visibly published or searchable, including, but not limited to, settings 116 and access specifications 120.

In the example, message 110 may be composed by one or more types of entities, through one or more types of interfaces, including, but not limited to a composition by a user who is a person entering the content of message 110 and a composition by automatic generation of message 110 by a service that automatically generates messages for a user for publication. In the example, message 110 may be composed within an interface, such as a browser, supported by a message management service, such as a social media message management service that manages publication of messages and provides some type of access management for users including, but not limited to, Facebook®, Twitter®, Instagram®, YouTube®, and blog hosting services. In another example, message may be composed within an interface, such as a stand-alone application, supported by a message management service for managing electronic publication of messages composed by users of the message management service to a publication interface accessible by other users of the message management service.

In the example, content 118 includes public elements 112, which may represent non-tagged and tagged text, graphics, photographs, and other content, and at least one restricted tag element 114, where restricted tag element 114 is a tag element including in content 118, but marked as restricted, and therefore restricted to access by only the selection of one or more users specified in authorized restricted tag accessors 124. In the example, access specifications 120 specify allowed message accessors 126, which are the one or more users who are allowed to access message 110. In addition, access specifications 120 specify authorized tag accessors 124, which are only a selection of one or more users from among allowed message accessors 126, which are allowed to access restricted tag element 114, as originally composed, when accessing message 110. In the example, all the users specified in allowed message accessors 126 may access message 110, including public elements 112, however, only the selection of users specified in authorized restricted tag accessors 124 are allowed to access restricted tag element 114 as composed in message 110. As described herein, access to a published message may include, but is not limited to, searching for a message by content element, storing a message, receiving a message, viewing a message, and listening to a message.

In the example, tagged content elements within content 118, whether present in public elements 112 or restricted tag element 114, represent a content element that includes a marking that identifies the content element as a tag, in contrast to non-tagged, general content elements within public elements 112. In one example, types of tags identified in content 118 may include, but are not limited to, one or more hashtags, where a hashtag is represented by a number symbol followed by a content element, one or more HTML tags, where an HTML tag is an HTML code element for a tag followed by a content element, and one or more geotags, where a geotag is a geotag symbol followed by a content element identifying a location.

In the example, restricted tag element 114 represents a content element with a marking that identifies the content element as a tag and that also identifies the tag as a restricted tag. In one example, a user may select a first textual symbol that identifies a tag within content 118, to mark a particular content element as a tag, and may select a second textual symbol that identifies a tag as a restricted tag, to mark the particular content element as restricted tag element 114. In another example, a user may select a single textual symbol that identifies both a tag and a restricted tag, to mark a particular content element as a restricted tag. In yet another example, a user may select, through an interface, to identify a content element within content 118 as a restricted tag, where one or more types of textual symbols are automatically inserted into content 118 to identify the content element as restricted tag element 118. While in the example illustrated content 118 includes both public elements 112 and a restricted tag element 114, in another example, content 118 may include only restricted tag elements and no public elements 112, where each restricted tag element within content 118 may include a separate selection of authorized restricted tag accessors or may share a common selection of authorized restricted tag accessors, and where access to message 110 is limited to allowed message accessors 126.

In one example, settings 116 represent one or more settings for restricted tag element 114. In one example, authorized restricted tag accessors 124 may be specified in metadata with settings 116 and in another example, authorized restricted tag accessors 124 may be specified in content 118, as part of the content element of restricted tag element 114. In addition, settings 116 may include specifications for how a restricted tag element is set to appear within content 118 when encrypted, whether a timer is set with an encrypted restricted tag element to automatically trigger decryption of the encrypted restricted tag element once the timer expires, and what type of republication of the restricted tag element is permitted.

In the example, in one embodiment, a published message 130 illustrates one example of how an access controller 128 restricts access to message 110 when published by a publication service 102. In the example, access controller 128 manages the limitations of access specifications 120 on message 110 in published message 130. In one example, one or more functions of access controller 128 are operative by publication service 102 in conjunction with publication service 102 providing publication of message 110. In another example, one or more functions of access controller 128 are operative by a service other than publication service 102, such as a controller at an operating system or application layer performing one or more of the encryption and decryption functions of access controller 128 separate from an operating system or application layer performing publication service 102. In addition, access controller 128 may be operative on one or more devices including, but not limited to, one or more devices used by the user composing composed message 100, one or more devices hosting publication service 102, and one or more devices used by users accessing message 110 once published by publication service 102.

In the example, published message 130 illustrates, at reference numeral 132, that access controller 128 limits access to message 110 to the users specified in allowed message accessors 126. Access controller 128 may limit access to message 110 overall to the users specified in allowed message accessors 126 by applying one or more types of security layers implemented by publication service 102 to control access to published messages to users. For example, if the user publishing composed message 100 has set the user's account with publication service 102 to a limited setting, and limited access to messages published by the user to only a selection of followers of the user, then access controller 128 applies security protocols to restrict access to each message published by the user to only the selection of followers of the users, when each of the selection of followers is properly logged into accounts through publication service 102. In another example, access controller 128 may not need to limit access to message 110 overall if a user does not specify any users in allowed message accessors 126 and any messages published by the users are published to a public interface accessible to any other user able to open a publication interface of publication service 102.

In the example, by access controller 128 limiting access to the message overall to allowed message accessors 126, as illustrated at reference numeral 132, effectively, access controller concurrently limits access to public elements 112 to the users allowed to access the message overall, as illustrated at reference numeral 134, for published message 130. In an alternate embodiment, access controller 128 may also apply a separate set of limitations for specifying which other users are allowed to access public elements 112.

In the example, access controller 128 limits access to restricted tag element 114 in published message 130, by encrypting restricted tag element 114 in a manner such that decryption is limited to authorized restricted tag accessors 124, and further specified according to settings 116, as illustrated by encrypted element 136. Access controller 128 may implement one or more types of encryption algorithms and functions to generate encrypted element 136, encrypting underlying restricted tag element 114, to limit access to restricted tag element 114 to only authorized restricted tag accessors 124 from among allowed message accessors 126 allowed to access published message 130. In one example, access controller 128 may implement public-key cryptography to encrypt restricted tag element 114 with the public key of each user included in authorized restricted tag accessors 124, wherein only the private key for each user included in authorized restricted tag accessors 124 allows for decryption of encrypted element 136. In the example of public-key cryptography, the public key and private key for a user are two parts of a key pair that are different, but are mathematically linked, to enable encryption of text using the public key, which a user may publish publicly without compromising security, but decryption of the encrypted text using the private key, which the user only provides to any component, service, or interface that is authorized to access messages for the user. In additional or alternate embodiments, in addition to or as an alternative to encryption/decryption, access controller 128 may implement other types of security features to limit access to restricted tag element 114.

In the example, the one or more protocols implemented by access controller 128 for encrypting restricted tag element 114 as encrypted element 136 may be performed separately or independent of any additional or alternate protocols implemented by any component or layer for encrypting message 110 overall. In one example, in addition to access controller 128 encrypting restricted tag element 114 as encrypted element 136 to restrict access to restricted tag element 114 to authorized restricted tag accessors 124, one or more additional encryption protocols may be applied to message 110 overall when published and accessed, separate from or independent of the encryption protocols applied to restricted tag element 114 to generate encrypted element 136. In one example, one or more components, including, but not limited to, access controller 128, publication service 102, or a network security protocol layer, may apply some level of encryption to message 110 overall, to provide data security when transmitting composed message 100 as published message 130 and to maintain the security of published message 130 until published through one or more authorized interfaces of publication service 102. In another example, access controller 128 may apply the limitations illustrated in reference numeral 132, on the message 110 overall, to limit access to the message 110 overall to allowed message accessors 126, by encrypting published message 130 in a manner such that only those users included in allowed message accessors 126 are enabled to decrypt the message overall and only a selection of allowed message accessors 126 that are also included in authorized restricted tag accessors 124 are further enabled to decrypt encrypted element 136 to access underlying restricted tag element 114.

In the example, publication service 102 publishes published message 130 for access by allowed message accessors 126 through one or more interfaces. In the example, an accessed message 140 and an accessed message 150 show examples of access to published message 130 through one or more interfaces by users included within allowed message accessors 126.

In the example, accessed message 140 shows an example of published message 130, as accessed by a user who is included in both allowed message accessors 126 and authorized restricted tag accessors 124. In the example, accessed message 140 is illustrated as a message 142, that includes public elements 112 and includes a decrypted element 146, output as the underlying restricted tag element 114 decrypted from the encrypted restricted tag element illustrated at reference numeral 136, and further specified per settings 116. In one example, settings 116 may specify the limitations on republication of decrypted element 146, such as a setting which allows the user to remove the restricted setting from restricted tag element 114 if the user selects to republish message 142 or a setting which only allows republication of message 142, as originally published in published message 130, with encrypted element 136.

In the example, accessed message 150 shows an example of published message 130, as accessed by a user who is included in allowed message accessors 126, but who is not included in authorized restricted tag accessors 124. In the example, accessed message 150 is illustrated as a message 152, that includes public elements 112 and includes a restricted tag encryption appearance element 156, which specifies how the encrypted restricted tag element is output within a message published to a user that is not included in authorized restricted tag accessors 124, specified per settings 116 in published message 130. In addition, accessed message 150 may include the underlying encrypted element 136, such that in the example where settings 116 may specify a timer that is triggered when restricted tag element 114 is encrypted in published message 130 and that upon expiration, automatically decrypts encrypted element 136, if the timer expires and restricted tag element 114 is automatically decrypted, restricted tag encryption appearance element 156 may be replaced by the decrypted, underlying restricted tag element 114.

Figure 2:
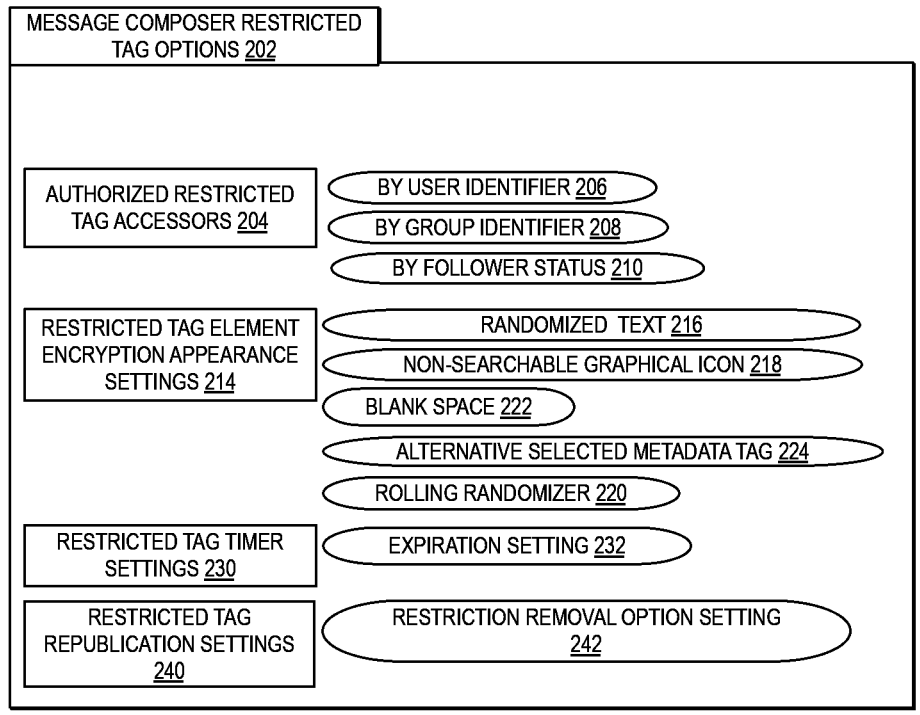
FIG. 2 is a block diagram illustrating one example of message composer restricted tag options for a user to specify when selecting the settings for a restricted tag element.

FIG. 2 illustrates a block diagram of one example of message composer restricted tag options for a user to specify when selecting the settings for a restricted tag element.

In the example, an interface through which a user composes message 110, such as one or more of an interface of publication service 102, an interface of access controller 128, or another service interface, may provide a user with one or more selectable options within the interface or may detect user selections through textual inputs within the interface, to enable the user to specify one or more of the settings illustrated in message composer restricted tag options 202.

In one example, message composer restricted tag options 202 may include an option for a user to specify authorized restricted tag accessors 204 according to multiple identifiers including, but not limited to, by user identifier 206, by group identifier 208, and by follower status 210. In one example, by user identifier 206 may include user identifiers for one or more users to include as authorized restricted tag accessors for a particular restricted tag element within a message. In one example, by group identifier 208 may include a group identifier specified in an electronic address book, in a list managed by a publication service, or in a file. In one example, by follower status 210 may include a status assigned to one or more followers of the composing user, where publication service 102 manages a list of other users allowed as followers of the composition user, and where a status may include, for example, an online status, such as "online" or "not busy". In the example, if a message includes multiple separate restricted tag elements, the option to specify authorized restricted tag accessors 204 may also include an option to specify a separate selection of accessors for each restricted tag or a same selection of accessors for all the restricted tags in a message.

In one example, message composer restricted tag options 202 may include an option for a user to specify restricted tag element encryption appearance settings 214. Restricted tag encryption appearance settings 214 specify the appearance of encrypted element 136 in published message 130. In one example, restricted tag element encryption appearance settings 214 may include a specification of non-readable encrypted text 216, specifying encrypted element 136 to appear as non-readable text representing the encrypted element. In one example, randomized text 216 may appear as textual elements that are non-readable, not matching any recognized word or phrase, such as a restricted tag element of "#project2013", encrypted as randomized text "#d2845kd7", where in a display of a message including a restricted tag element, users that are not authorized restricted tag element accessors would view the message with the encrypted element appearing as "#d2845kd7" and users that are authorized restricted tag element accessors would view the message with the decrypted underlying restricted tag element appearance as "project2013". In one example, restricted tag element encryption appearance settings 214 may include a specification of non-searchable graphical icon 218, specifying encrypted element 136 to appear as a non-searchable graphical icon, such as a smiley face. In one example, restricted tag element encryption appearance settings 214 may include a specification of blank space 222, specifying encrypted element 136 to appear as a blank space or no space. In another example, restricted tag element encryption appearance settings 214 may include a specification of alternative selected metadata tag 224, specifying encrypted element 136 to appear as a searchable, readable tag that is different from restricted tag element 114. In another example, restricted tag element encryption appearance settings 214 may include a specification of a rolling randomizer 220, where for any of the options 216, 218, 222, and 224, if rolling randomizer 220 is selected, then when a same tag is associated with multiple messages, the appearance of encrypted element 136 may be randomized in some manner for each message. For example, if a user selects an option of non-searchable graphical icon 218 and the user selects an option of rolling randomizer 220, access controller 128 may automatically randomize which graphical icon is selected, from among two or more available non-searchable graphical icons, in each concurrent message in which non-searchable graphical icon 218 is selected for specifying the appearance of encrypted element 136.

Figure 3:
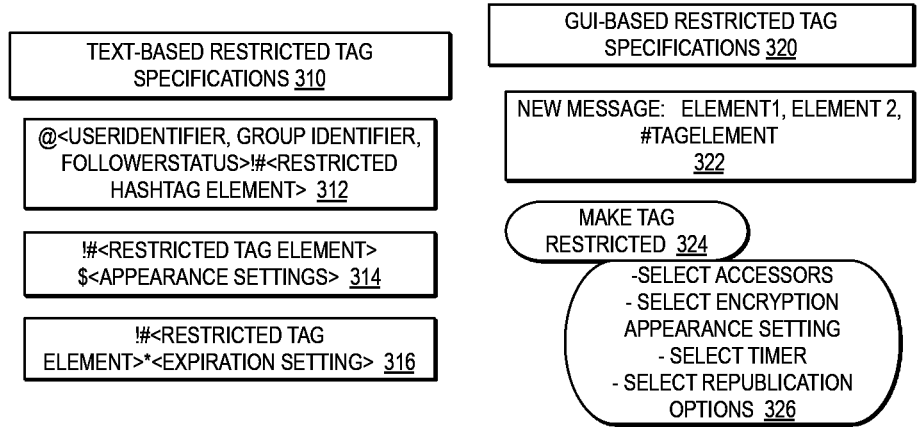
FIG. 3 is a block diagram illustrating examples of text-based restricted tag specification and user interface based restricted tag specifications of message composer restricted tag options.

FIG. 3 illustrates a block diagram of examples of text-based restricted tag specification and user interface based restricted tag specifications of message composer restricted tag options.

In one example, examples of text based restricted tag specifications, as illustrated at reference numeral 310, include a first example 312, illustrating an example of restricted tag element 114 and authorized restricted tag accessors 124, defined through text in content 118. In first example 312, authorized restricted tag accessors 124 are defined under "@<useridentifier, groupidentifier, followerstatus", where the "@" symbol indicates a specification of user or group identifiers or status identifiers to specify at least one user within authorized restricted tag accessors 124 with a specification of "useridentifier" for by user identifier 206, of "groupidentifier" for by group identifier 208, or of "followerstatus" for by follower status 210. In first example 312, the content element is identified as a restricted hashtag element by the use a marking indicating "restricted", such as the exclamation point ("!"), prior to the identifier of a hashtag by number symbol ("#"), such that "!#<restricted hashtag element>", as marked, specifies restricted tag element 114. The use of the exclamation point to mark a hashtag as "restricted" is one example of one type of marking within text of content 118 that may be specified to indicate a restricted tag element. In additional or alternate embodiments, other types of marking within content 118 may be implemented to specify a tagged content element as a restricted tag element.

In one example, examples of text based restricted tag specifications, as illustrated at reference numeral 310, include a second example 314, illustrating an example of restricted tag element 114 and restricted tag element encryption appearance settings 214, defined through text in content 118. In second example 314, "!#<restricted tag element>", as marked, specifies restricted tag element 114. In second example 314, by placing a marker for appearance settings, such as the money symbol ("$"), following text identifying a restricted tag element, a user may further specify, in text following the money symbol, one or more options for setting "<appearance settings>", such as specifying one or more of the options illustrated in FIG. 2 under restricted tag element encryption appearance settings 214. For example, within text, in second example 314, a user may specify randomized text 216 and a number of characters of the randomized text as four characters by entering "$<randomized=[4]>", a user may specify non-searchable graphical icon 218 and specify the icon as a "smiley face" by entering "$<graphicalicon=smiley", a user may specify blank space 222 by entering "$<blank>", a user may select alternative selected metadata tag 224 with the keyword of "project2013" and rolling randomizer 222 for a first character of the keyword, by entering "$<alternative="[A]project2013", randomizer [A]". The use of the money symbol to mark the text following the money symbol as the appearance setting for an associated restricted tag element is one example of one type of marking within text of content 118 that may be specified to denote an appearance setting for a restricted hash tag. In additional or alternate embodiments, other types of marking within content 118 may be implemented to specify appearance settings for a restricted tag element.

In one example, examples of text based restricted tag specifications, as illustrated at reference numeral 310, include a third example 316, illustrating an example of restricted tag element 114 and restricted tag timer settings 230. In third example 316, "!#<restricted tag element>", as marked, specifies restricted tag element 114. In third example 316, by placing a marker for expiration settings, such as the asterisk symbol ("*"), following text identifying a restricted tag element, a user may further specify, in text following the asterisk symbol, one or more options for setting "<expiration settings>", such as specifying expiration setting 232. In one example, a user may specify the expiration of an encrypted restricted tag element after 5 minutes by entering "*<5, minutes>" or the expiration of an encrypted restricted tag element after a certain time in a particular time zone by entering "*<14:00:00, CST>" for "14:00:00" under central standard time (CST). The use of the asterisk symbol to mark the text following the asterisk symbol as the expiration setting for an associated restricted tag element is one example of one type of marking within text of content 118 that may be specified to denote an appearance setting for a restricted hash tag. In additional or alternate embodiments, other types of marking within content 118 may be implemented to specify appearance settings for a restricted tag element.

In another example, examples of graphical user interface (GUI) based restricted tag specifications, as illustrated at reference numeral 320, include an interface 322 in which a user is composing a new message that includes multiple content elements, including "element1", "element2", and "#tagelement", where "#tagelement" represents a hashtag. In one example, publishing service 102 supports interface 322 and the selectable options associated with interface 322. In another example, additional or alternate components, such as access controller 128, an operating system, or other component, may support interface 322 and the selectable options associated with interface 322. In the example, a user selects the text of "#tagelement" within interface 322 and may select a selectable option 324, within interface 322 or within another interface, to mark a selected tag as a restricted tag. In the example, by selecting a tag element within interface 322 and selecting selectable option 324, a user may select, through one or more interfaces, to identify a tag element as a restricted tag element. In one example, publishing service 102 may provide selectable option 324 within an interface, and in response to a user selection of selectable option 324, automatically insert code tags or textual markers into the message in interface 322 to mark "#tagelement" as restricted tag element 114. In addition, in the example, in response to a user selection of selectable option 324, within interface 322 or another interface, a user may select from other selectable options illustrated as selectable settings options 326, including, but not limited to, selecting accessors for the restricted tag element, selecting the encryption appearance settings, selecting timer settings, and selecting republication options. In one example, selectable settings options 326 provides an interface through which a user may specify one or more of the settings illustrated in message composer restricted tag options 202, and in response to selections within selectable settings options 326, publishing service 102 may automatically insert code tags or textual makers into the content of the new message or the metadata of the new messages to reflect the user selections through the interface. Upon a user selection to further specify one or more of the selectable options within selectable setting options 326, publishing service 102 may open additional interfaces to options for specifying each of the settings for a restricted tag element.

Figure 4:
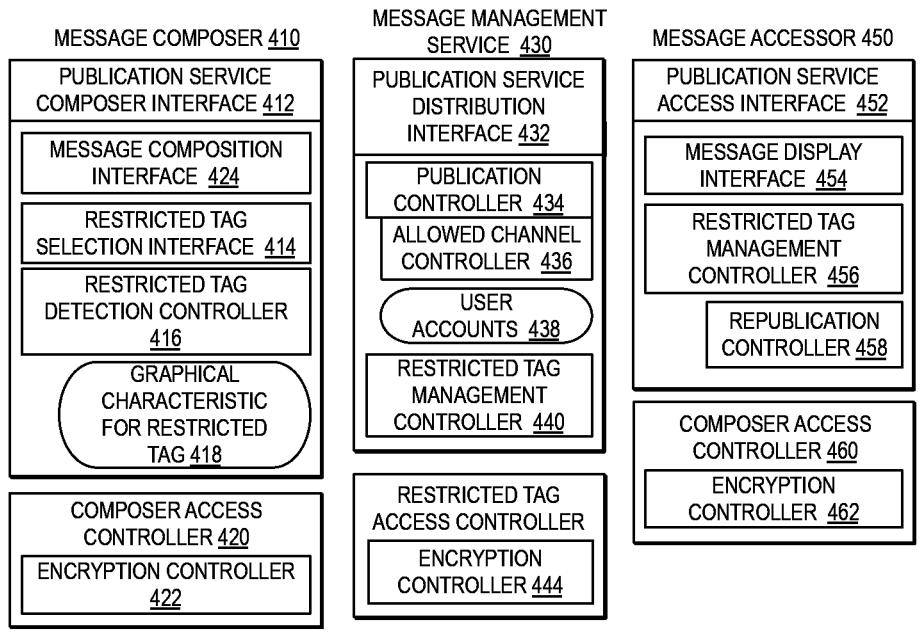
FIG. 4 is a block diagram illustrating one example of one or more controllers implemented to manage a restricted tag element within the content of a published message.

FIG. 4 illustrates a block diagram of one example of one or more controllers implemented to manage a restricted tag element within the content of a published message.

In the example, each of a message composer 410, representing an entity that composes a message, a message management service 430, representing an entity for managing the publication and distribution of messages, and a message accessor 450, representing an entity that accesses a published message, may each implement one or more devices and may each implement a portion of or all of the functional components of access controller 128 and publication service 102.

In one example, message composer 410 accesses a device that implements one or more components of publication service 102 through a publication service composer interface 412. In the example, message composer 410 composes a message to be published through a message composition interface 424. In addition, publication service composer interface 412 may include a restricted tag selection interface 414 for providing one or more interfaces providing selectable options through which a user may select to identify a tagged element as a restricted tag element and through which a user may select to specify one or more of message composer restricted tag options 202. In one example, restricted tag selection interface 414 enables a user to select from among selectable options to set one or more of message composer restricted tag options 202 as illustrated by the selectable options in GUI-based restricted tag specifications 320. In another example, restricted tag selection interface 414 may also enable a user to select options to add textual markings into a message to identify restricted tag elements and one or more of message composer restricted tag options 202 by prompting the user with one or more of the markings specified in text-based restricted tag specifications 310. In addition, publication service composer interface 412 may implement a restricted tag detection controller 416 for detecting when an entity has made selections to mark a tagged element within a message as a restricted tag element and for automatically adjusting the appearance of the restricted tag element within message composition interface 424 according to a graphical characteristic for restricted tag 418, such that a user viewing the composed message can visibly determine, from the appearance of the restricted tag element set to the graphical characteristic for restricted tag 418, that a particular tagged element within has been specified as a restricted tag element.

In one example, message composer 410 implements one or more components of access controller 128 for specifying allowed message accessors 126, through selections by the user of allowed message accessors 126 for a particular message within message composition interface or through the settings within user accounts 438, of message management service 430, specifying allowed message accessors 126 for any messages published by message composer 410. Publication service composer interface 412 may open a secured channel to a publication service distribution interface 432 of message management service 430 to manage transmission of the message composed within message composition interface 424, with access to the message overall limited to allowed message accessors 126. In addition, in the example, message composer 410 may access a device that implements one or more components of access controller 128 through a portion of access controller 128 implemented as a composer access controller 420. In one example, composer access controller 420 is implemented as a function of publication service composer interface 412 and in another example, composer access controller 420 is implemented by a component separate from publication service composer interface 412. In one example, composer access controller 420 detects a restricted tag element composed within a message within publication service composer interface 412 and calls an encryption controller 422 to encrypt the restricted tag element within the message with one or more public keys for the one or more users identified as authorized restricted tag accessors for the restricted tag element, such that only the selection of one or more users identified as authorized restricted tag accessors may decrypt the encrypted restricted tag element using the one or more private keys matching each of the one or more public keys to access the underlying restricted tag element. In one example, encryption controller 422 may access public keys for the users specified as authorized restricted tag accessors from a database comprising a repository of the public keys of multiple users, by requesting the public key from the users through communications channels hosted by a message management service or other service, from user account directories managed by a message management service, and through other access channels. In another example, composer access controller 420 detects a restricted tag element composed within a message within message composition interface 424, marks the message as including a restricted tag element, and may add an additional level of data security to the transmission of the message to publication service distribution interface 432, such as through encryption controller 422 adding an a layer of encryption to the message or using a secured channel for transmission, where message management service 430 then manages the encryption of the restricted tag element when publishing the message.

In one example, message management service 430 implements one or more components of publication service 102 through a publication service distribution interface 432, which manages the receipt of incoming messages from publication service composer interface 412 to be published by publication service 102 and manages the output of published messages for access by one or more users. In addition, publication service distribution interface 432 may implement one or more of the functions of access controller 128 through allowed channel controller 436, which manages the publication of messages to users specified as allowed message accessors for the messages.

In one example, publication service distribution interface 432 includes a publication controller 434 for managing the publication of messages through one or more channels, applying one or more levels of security to limit access to messages to the allowed message accessors specified for a message or specified for all messages sent by the entity registered as message composer 410. In one example, a message may specify the allowed message accessors for the message according to a group identifier, where the group and the user specified in the group are identified in the account for message composer 410 within user accounts 438. In one example, the selection of allowed message accessors for messages published by message composer 410 are specified within the account for message composer 410 within user accounts 438. In another example, the selection of allowed message accessors for messages published by message composer 410 may include all users able to access an interface in which messages are published by message management service 430, such that any message composed by message composer 410 and published by message management service 430 is considered publically available via the internet.

In the example, publication controller 434 manages the publication of messages that include restricted tag elements, where access to restricted tag elements is limited to only a selection of one or more users from among the total users allowed to access the message containing the restricted tag element, identified as the authorized restricted tag accessors. In one example, publication service distribution interface 432 implements a restricted tag management controller 440 to detect restricted tag elements within messages managed by publication controller 434 and to specifically manage how the restricted tag element, including the settings for the restricted tag element, are distributed and accessed. In one example, restricted tag management controller 440 may call a restricted tag access controller 442, to perform one or more access control functions of access controller 128 for the restricted tag element. In one example, if a message is received from publication service composer interface 412 that includes a restricted tag element that is not yet encrypted, restricted tag access controller 442 may call encryption controller 444 to encrypt the restricted tag element such that only the users identified in a selection of authorized restricted tag accessors are enabled to decrypt the encrypted restricted tag element and access the underlying restricted tag element. In another example, if a message is received from publication service composer interface 412 includes a restricted tag element that is already encrypted, restricted tag management controller 440 may call restricted tag access controller 442 to manage the application of any appearance settings for the restricted tag element within the published message, to manage tracking a timer for a restricted tag element and automatically decrypting the encrypted restricted tag element when a timer expires, or for managing other settings options specified for the restricted tag element with the restricted tag element or in the user account for message composer 410 within user accounts 438. In another example, if a message is received from publication service composer interface 412 that includes a restricted tag element that is encrypted, restricted tag management controller 440 may call restricted tag access controller 442 to manage decryption of the restricted tag element at the publication level, wherein restricted tag access controller 442 and publication controller 434 are able manage distribution of the published message, with the decrypted restricted tag element, for access by the selection of one or more users specified as authorized restricted tag accessors and distribution of the published message, with the encrypted restricted tag element, for access by the other users who are allowed message accessors, but not included as authorized restricted tag accessors. In one example, restricted tag access controller 442 may call encryption controller 444 to automatically decrypt the encrypted restricted tag element within a message using the private key of an authorized restricted tag accessor retrieved from user accounts 438 and restricted tag access controller 442 may control distribution of the message with the decrypted underlying restricted tag element on a channel that is only accessible to the authorized restricted tag accessor. In one example, encryption controller 444 may access the private key for a user from user accounts 438, from a third party security service, or through an interface accessible to message accessor 450.

In one example, message accessor 450 accesses one or more components of publication service 102 through a publication service access interface 452, which manages the receipt and output of published messages from publication service distribution interface 432. In addition, publication service access interface 452 may implement one or more components of access controller 128. In one example, publication service access interface 452 may receive messages pushed from publication service distribution interface 452 or may pull messages from publication service distribution interface 452, on behalf of an entity identified as message accessor 450. In one example, message accessor 450 may be a user with a registered user account with message management service in user accounts 438. In another example, message accessor 450 may be a non-registered user of message management service 430 through publication service access interface 452.

In the example, publication service access interface 452 includes a message display interface 454 for controlling the display of incoming messages published by message management service 430, along with a restricted tag management controller 456 for managing the output of restricted tag elements included within published messages. In one example, restricted tag management controller 456 detects restricted tag elements within messages received by publication service access interface 452 and may call composer access controller 460 to manage access to the restricted tag element. In the example, composer access controller 460 performs or more functions of access controller 128. In one example, if a received published message includes a restricted tag element that is encrypted, restricted tag management controller 456 may detect the encrypted restricted tag element and call composer access controller 460 to apply the settings for the encrypted restricted tag element. Applying the settings for the encrypted restricted tag element may include calling encryption controller 462 to decrypt the encrypted restricted tag element, if message accessor is an authorized restricted tag accessor, or performing one or more of the other settings options, such as setting the appearance of the encrypted restricted tag element within the published message.

In one example, restricted tag management controller 456 may detect, within messages, restricted tag elements that are already decrypted, but marked as restricted tag elements with settings included, and restricted tag management controller 456 may detect encrypted restricted tag elements, which are then decrypted by encryption controller 462 and the underlying restricted tag element is published with the message, but the decrypted restricted tag element remains marked as a restricted tag element with settings. In one example, if a restricted tag element is decrypted and displayed within message display interface, but marked as a restricted tag element with settings, restricted tag management controller 456 may trigger a republication controller 458 to monitor for any request by message accessor 450 republish the message with the decrypted restricted tag element and to call composer access controller 460 to manage encryption of the restricted tag element or removal of the restricted setting, if allowed by restriction removal option setting 242, before the message is permitted to be republished by message accessor 450.

Figure 5:
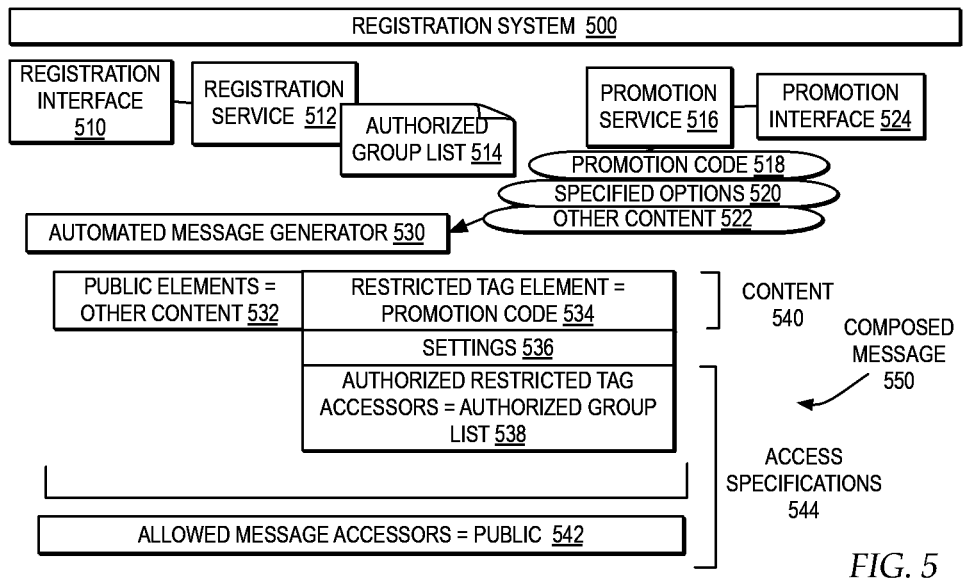
FIG. 5 is a block diagram illustrating one example of a registration system for incentivizing users to register with a registration service by sending out messages to the registered user with promotion codes included in restricted tag elements.

FIG. 5 illustrates a block diagram of one example of a registration system for incentivizing users to register with a registration service by sending out messages to the registered user with promotion codes included in restricted tag elements.

In one example, a registration system 500 includes a registration interface 510, through which a user may enter information to register with a registration service 512, to be included in an authorized group list 514. In one example, registration service 512 is a service of publication service 102 and through registration interface 510, a user may select to be included in authorized group list 514 by selecting, in some manner, to follow, like, approve, or otherwise indicate a selection to be added to authorized group list 514. In another example, a user may select to be included in authorized group list 514 by entering information in a specified registration form within registration interface 510. In one example, a user selecting to be placed in authorized group list 514, a user may agree to be publicly displayed as included in authorized group list 514 and a user may agree to receive messages from one or more entities associated with authorized group list 514.

In the example, an entity authorized to publish messages to authorized group list 514 may provide a promotion service 516 for managing a promotion offered by the entity. In one example, promotion service 516 may provide a particular service that is only accessible with user entry of a promotion code 518 through a promotion interface 524

In the example, promotion service 516 may select to distribute promotion code 518 to only the one or more users registered within authorized group list 514, providing an incentive for users to select to register within authorized group list 514 or providing a way for a service provider to limit the number of users that are provided with a promotion code as a way to access a particular service provided by the service provider. In one example, promotion service 516 may call an automated message generator 530 with promotion code 518, specified options 520 for setting promotion code 518 as a restricted tag element limited to authorized group list 514, and any other content 522, such as a link to promotion interface 524, to automate generation of a composed message 550 with promotion code 518 set as a restricted tag element and other content 522 in the message and automate sending of composed message 550 to any users within authorized group list 514. In another example, a user may enter composed message 550 with promotion code 518 set to a restricted tag element and any other content 522 through message composition interface 424.

In the example, content 540 of composed message 550 includes public elements 532, set to other content 522, and a restricted tag element 534, set to promotion code 518, according to specified options 520. In addition, composed message 550 may include one or more settings from specified options 520 for specifying one or more message composer restricted tag options for restricted tag element 534. In addition, access specifications 544 are set for composed message 550 including allowed message accessors 542 allowed to access composed message 550 set to "public" and authorized restricted tag accessors 538 allowed to access restricted tag element 534 within composed message 550 set to authorized group list 514.

In the example, message management service 430 may publish composed message 550, with restricted tag element 534 encrypted to only allow decryption by the one or more users within authorized group list 514, through a publicly available interface, such that any user with access to publication service access interface 452 of message management service 430 may access composed message 550. Only the selection of users specified in authorized group list 514, when accessing composed message 550 as published through publication service access interface 452, with restricted tag element 534 encrypted, are allowed to decrypt the encrypted restricted tag element to access underlying restricted tag element 534.

Figure 6:
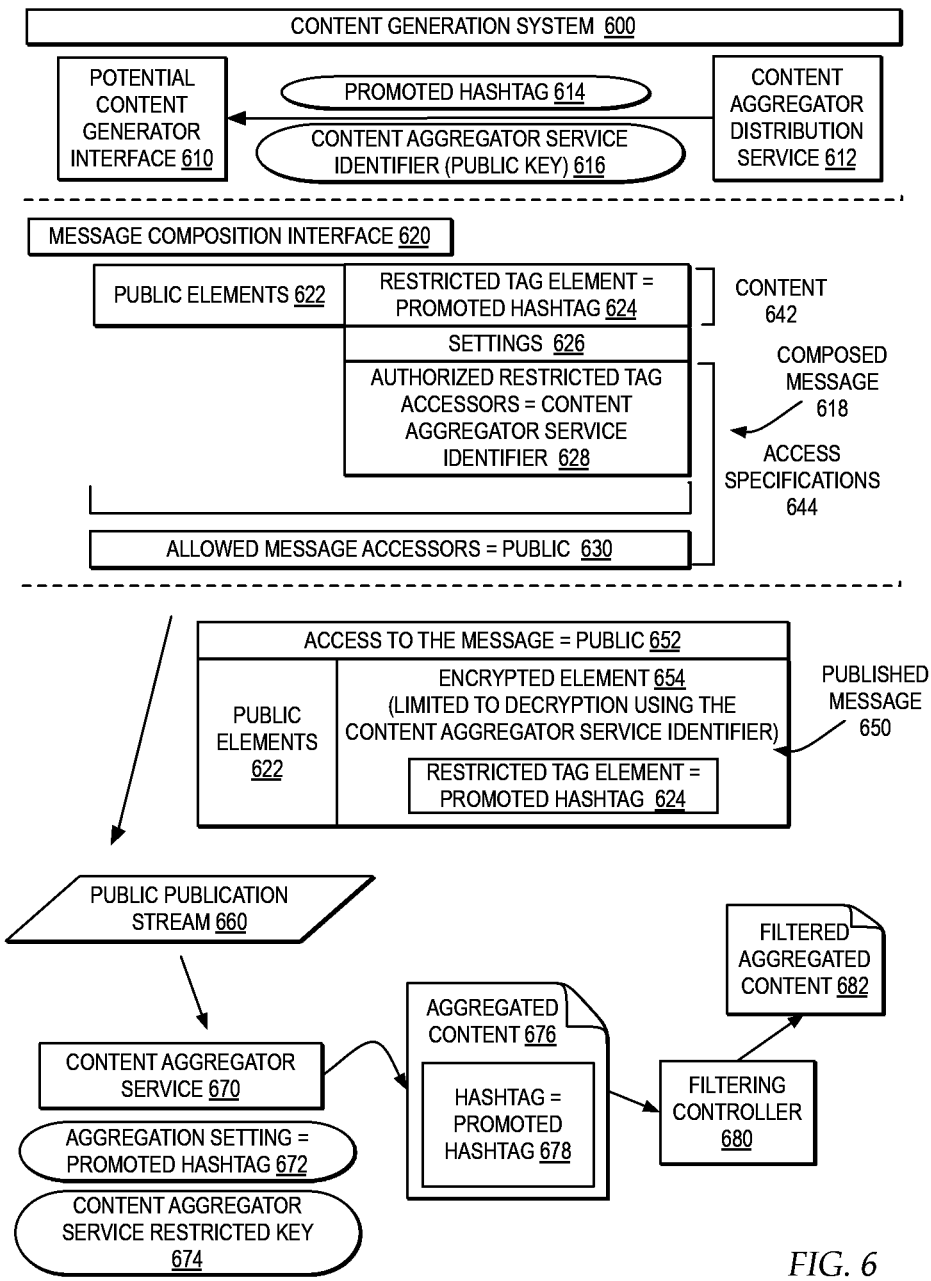
FIG. 6 is a block diagram illustrating one example of a content generation system for incentivizing content generators to create content that includes a particular restricted hash tag for aggregation by a particular aggregator included in the authorized restricted tag accessors for the particular restricted hash tag.

FIG. 6 illustrates a block diagram of one example of a content generation system for incentivizing content generators to create content that includes a particular restricted hash tag for aggregation by a particular aggregator included in the authorized restricted tag accessors for the particular restricted hash tag.

In one example, a content aggregator may refer to a service that searches for messages, published by one or more online publishing sources, with content including a particular tag and aggregates the messages including the particular tag. The content aggregator may output the aggregated messages through a publishing interface for access by one or more users enabled to access the publishing interface. In addition, the content aggregator may store the aggregated messages for collecting records of messages published with the particular tag through one or more online publishing sources. In one example, an entity may promote the use of a particular hashtag by users who are generating messages about a particular product, event, or other occurrence, where any content aggregator may aggregate messages including the particular hashtag. In another example, as illustrated in content generation system 600, a content aggregator, or other entity, may promote the use of a particular restricted hashtag within content generated about a particular product, event, or occurrence, with the content aggregator included in the authorized restricted tag accessors for the particular restricted hashtag, such that access to and aggregation of messages with the particular restricted hashtag is limited to a particular content aggregator. In one example, the particular content aggregator may implement a subscription service, where users subscribe to the subscription service to access the content aggregated by the content aggregator. In another example, the particular content aggregator may filter the aggregated content before publishing the aggregated content in a particular interface.

In one example, a content generator system 600 includes one or more components implemented by a content aggregator for promoting the generation of content including a particular restricted hashtag, where the content aggregator is included in the authorized restricted tag accessors for the restricted hashtag. In the example, a content aggregator distribution service 612 distributes a promoted hashtag 614 and a content aggregator service public identifier 616, such as a public key, through one or more interfaces. In one example, a user may access promoted hashtag 614 and content aggregator service identifier 616 through a potential content generator interface 610, such as a browser, a publisher interface, an email interface, or other types of interfaces through which one or more users may access data from content aggregator distribution service 612.

In the example, a content creator, who has received promoted hashtag 614 and content aggregator service identifier 616 through potential content generator interface 610 may select to compose a message 618 through a message composition interface 620. In the example, within message composition interface 620, the content creator may add content 642 to composed message 618, where content 642 may include public elements 622 and a restricted tag element 624 set to promoted hashtag 614. In one example, in addition to pushing promoted hashtag 614 for insertion in messages as a restricted tag element 624, content aggregator distribution service 612 may also push elements to be inserted in content 642 as public elements 622. In the example, a content creator may specify one or more settings 626 for restricted tag element 624, setting one or more of the options identified in message composer restricted tag options 202, or content aggregator distribution service 612 may include one or more specifications for settings 626 with promoted hashtag 614. In the example, access specifications 644 may be specified for composed message 618 with authorized restricted tag accessors 628, for restricted tag element 624, set to include content aggregator service identifier 616, and with allowed message accessors 630, for composed message 618 as a whole, set to public, allowing for unrestricted access to composed message 618.

In the example, composed message 618 is published as published message 650, through a publication service such as publication service 102, to a public publication stream 660, which includes all the messages published by the particular publication service. An access controller 128 controls the access restrictions on published message 650, which in the example illustrated, include setting the access to the message to "public" per the setting in allowed message accessors 630, as illustrated at reference numeral 652, and encrypting restricted tag element 624, published in published message 650 as encrypted element 654, and limited to decryption using the content aggregator service identifier, per the setting in authorized restricted tag accessors 628.

In the example, content aggregator service 670 search messages published in public publication stream 660 according to tagged elements. In one example, in the instance of public publication stream 660 that is accessible by content aggregator service 670, restricted tag access controller 442 calls encryption controller 444 to decrypt any encrypted elements within each message using content aggregator service 670 private key 674 for access by content aggregator service 670 and content aggregator service 670 searches the instance of public publication stream 660, with encrypted elements decrypted to the underlying restricted tag elements, for hashtags matching the promoted hashtag. In another example, content aggregator service 670 includes a restricted tag management controller 456 that detects encrypted element 654 marked within published message 650 and limited to decryption by the content aggregator service identifier 616 and calls composer access controller 460 to decrypt encrypted element 654 with content aggregator service private key 674, or another decryption identifier. In the example, content aggregator service 670 may include one or more aggregation settings specifying the tags to be searched for within messages published in public publication stream 660, such as aggregation setting 672, which is set to promoted hashtag 614. In the example, content aggregator service 670 aggregates messages from pubic publication stream 660, identified as including promoted hashtag 616, within aggregated content 676. As illustrated, all the messages included within aggregated content 676, will include a hashtag 678 that is set to promoted hashtag 614.

In one example, the messages included in aggregated content 676 each include a hashtag that is set to promoted hashtag 614, whether publicly published or published as an encrypted element. In the example, prior to publishing aggregated content 676, a filtering controller 680 may perform additional filtering of the messages within aggregated content 676. In one example, filtering controller 680 may filter the messages within aggregated content 676 by removing the promoted hashtag element from each message or by replacing the promoted hashtag element within each message with an alternative hashtag or other type of content element. In another example, filtering controller 680 may filter the messages within aggregated content 676 by removing the restricted setting on the promoted hashtags that were originally published as restricted tag elements, such that when each of the originally published restricted tag elements is republished within the aggregated content, the promoted hashtag is publicly available. In another example, filtering controller 680 may apply additional or alternate types of filtering to the messages included in aggregated content 676.

Filtering controller outputs the filter changes to aggregated content 676 as filtered aggregated content 682. In one example, filtering controller 680 may publish filtered aggregated content 682 through a publication service for output within public publication stream 660. In another example, filtering controller 680 may publish filtered aggregated content 682 through an interface managed by content aggregator service 670, where users subscribe to a subscription service or membership to access the interface managed by content aggregator service 670 and to access filtered aggregated content 682 within that interface. In additional or alternate embodiments, filtering controller 680 may manage distribution of filtered aggregated content 682 through one or more interfaces.

Figure 7:
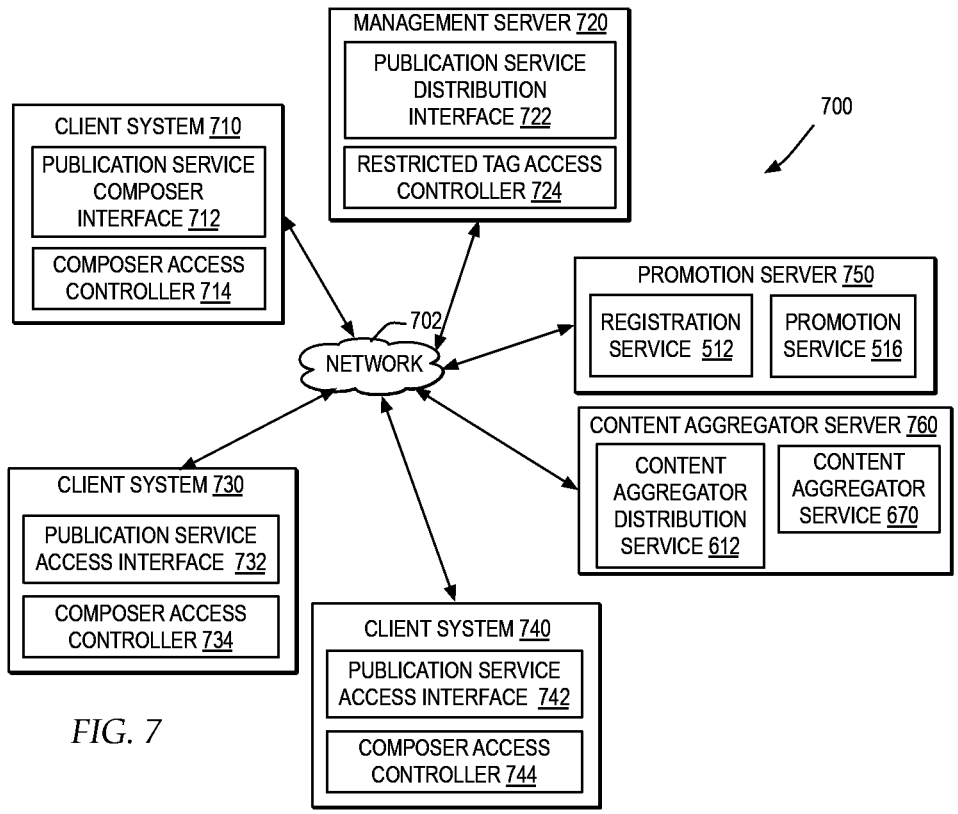
FIG. 7 is a block diagram illustrating one example of a network environment in which management of messages published with restricted tag elements may be implemented.

With reference now to FIG. 7, a block diagram illustrates one example of a network environment in which management of messages published with restricted tag elements may be implemented. One of ordinary skill in the art will appreciate that environment 700 is illustrative of one type of network environment that may support clients, servers and other components through which messages are electronically published and distributed. In addition, one of ordinary skill in the art will appreciate that the distribution of systems and the distribution of components within systems within network environment 700 are illustrative of a distribution of systems and components, however, other distributions of systems and components within a network environment may be implemented.

As illustrated, multiple systems within network environment 700 may be communicatively connected via network 702, which is the medium used to provide communications links between various devices and computer systems communicatively connected. Network 702 may include permanent connections such as wire or fiber optics cables and temporary connections made through telephone connections and wireless transmission connections, for example, and may include routers, switches, gateways and other hardware to enable a communication channel between the systems connected via network 702. Network 702 may represent one or more of packet-switching based networks, telephony based networks, broadcast television networks, local area and wire area networks, public networks, and restricted networks. Network environment 700 may implement multiple types of network architectures.

Network 702 and the systems communicatively connected within network environment 700 via network 702 may implement one or more layers of one or more types of network protocol stacks which may include one or more of a physical layer, a link layer, a network layer, a transport layer, a presentation layer, and an application layer. For example, network 702 may implement one or more of the Transmission Control Protocol/Internet Protocol (TCP/IP) protocol stack or an Open Systems Interconnection (OSI) protocol stack. In addition, for example, network 702 may represent the worldwide collection of networks and gateways that use the TCP/IP suite of protocols to communicate with one another. Network 702 may implement a secure HTTP protocol layer or other security protocol for securing communications between systems. Network 702 may implement an encryption protocol layer through which messages, or through which restricted tag elements within a message, are encrypted and decrypted through one or more encryption protocols.

In the embodiment, as illustrated, a client system 710, a client system 730, and a client system 740 are communicatively connected via network 702 to one or more of management server 720, a promotion server 750, and a content aggregation server 760. Each of client system 710, client system 730, client system 740, management server 720, promotion server 750, and content aggregation server 760 may represent one or more computer systems, such as computer system 800 of FIG. 8, to be described below. In one example, any of the clients and servers illustrated may represent a same physical device, but different logical devices with different network addresses. In one example, each of client system 710, client system 730, client system 740, management server 720, promotion server 750, and content aggregation server 760 may execute one or more interfaces, where each interface is executed as functions of a browser or other network interface application, as plug-ins, as stand-alone functions, as functions of an operating system layer, or as other executable components of the computer system. In one example, each of client system 710, client system 730, client system 740, management server 720, promotion server 750, and content aggregation server 760 may represent a networked environment including multiple server systems.

In one example, client system 710 hosts one or more components utilized by message composer 410, such as a publication service composer interface 712 for performing one or more of the functions described with reference to publication service composer interface 412 and a composer access controller 714 for performing one or more of the functions described with reference to composer access controller 420. One or more of publication service composer interface 712 and composer access controller 714 may be performed by additional or alternate systems.

In one example, management server 720 hosts one or more components performed by message management service 430, such as a publication service distribution interface 722 for performing one or more of the functions described with reference to publication service distribution interface 432 and a restricted tag access controller 724 for performing one or more of the functions described with reference to restricted tag access controller 442. One or more of publication service composer interface 712 and composer access controller 714 may be performed by additional or alternate systems.

In one example, client system 730 hosts one or more components utilized by message accessor 450, such as a publication service access interface 732 for performing one or more of the functions described with reference to publication service access interface 452 and a composer access controller 734 for performing one or more functions described with reference to composer access controller 460. In addition, in one example, client system 740 hosts one or more components utilized by message accessor 450, such as a publication service access interface 742 for performing one or more of the functions described with reference to publication service access interface 452 and a composer access controller 744 for performing one or more functions described with reference to composer access controller 460. One of publication service access interface 732, composer access controller 734, publication service access interface 742, and composer access controller 744 may be performed by additional or alternate systems.

In one example, a message composer composes and publishes a message from client system 710, where the message includes a restricted tag element, and management server 720 manages the publication of the message to allowed message accessors, such that only a selection of authorized restricted tag accessors accesses the underlying restricted tag element within the published message. In one example, the users logged in through publication service access interface 732 and publication service access interface 742 are both included in the allowed message accessors for a message published by management server 720, however, only a first user logged in through publication service access interface 732 of client system 730 is included in the selection of authorized restricted tag accessors for the restricted tag element. In the example, composer access controller 734 is enabled to decrypt the restricted tag element for a first user logged in to access published messages from management server 720 through publication service access interface 732, such that the published message accessible to the first user at client system 730 includes the underlying restricted tag element, however, composer access controller 744 is not enabled to decrypt the restricted tag element for a second user logged in to access published messages from management server 720 through publication service access interface 742, such that the published message accessible to the second user at client system 740 displays an encrypted element for the underlying restricted tag element.

In one example, promotion server 750 may host one or more components described with reference to registration system 500. For example, promotion server 750 may host registration service 512 and promotion service 516, along with the interfaces for each service. In one example, a user at client system 730 may register with promotion server 750 through registration interface 510 of registration service 512. Upon publication service access interface 732 of client system 730 accessing a message composed by an entity at client system 710 and published by management server 720, with a restricted tag element including a promotion code, encrypted for access by only those users registered with registration service 512, composer access controller 734 may decrypt the encrypted restricted tag element in the published message to access the promotion code in the underlying restricted tag element and present the promotion code to promotion service 516 through promotion interface 524, to receive a promotion associated with the promotion code from promotion server 750. In contrast, if a user at client system 740 is not registered through registration service 512, while publication service access interface 742 may access the same feed with the published message by the entity from management server 720, composer access controller 744 is not enabled to decrypt the encrypted restricted tag element to access the underlying restricted tag element with the promotion code. One or more of the components of registration system 500 may be performed by additional or alternate server systems.

In one example, content aggregator server 760 may host one or more components described with reference to content generation system 600. For example, content aggregator server 760 may host content aggregator distribution service 612 and content aggregator service 670. In one example, a user at client system 710 may access, through content aggregator server 760, a promoted hashtag and content aggregator service identifier via potential content generator interface 610 of content aggregator distribution service 612. The user at client system 710 may compose and publish a message that includes a restricted hashtag set to the promoted hashtag and management server 720 may manage encryption of the restricted hashtag within the message for access only by the content aggregator service identifier private key and manage publication of the message to one or more publishing interfaces. In the example, content aggregator service 670 accesses the published message from the publishing interface and decrypts the encrypted restricted tag element within the message to access the underlying restricted tag element and add the message to the a selection of aggregated messages published with the promoted hashtag. Content aggregator service 670 may filter the aggregated messages published the promoted hashtag and publish the filtered aggregated messages.

Figure 8:
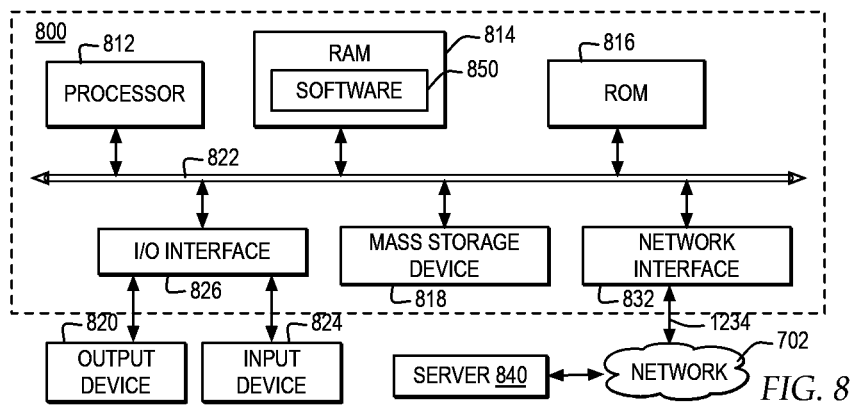
FIG. 8 is a block diagram illustrating one example of a computer system in which one embodiment of the invention may be implemented.

FIG. 8 illustrates a block diagram of one example of a computer system in which one embodiment of the invention may be implemented. The present invention may be performed in a variety of systems and combinations of systems, made up of functional components, such as the functional components described with reference to a computer system 800 and may be communicatively connected to a network, such as network 702.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 812 may control the operations of flowchart of FIGS. 9-12 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components. In one embodiment, one or more components of computer system 800, or other components, which may be integrated into one or more components of computer system 800, may contain hardwired logic for performing the operations of flowcharts FIGS. 9-12.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, micro-code, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 702, through a communication interface, such as network interface 832, over a network link that may be connected, for example, to network 702.

In the example, network interface 832 includes an adapter 834 for connecting computer system 800 to network 702 through a link and for communicatively connecting computer system 800 to server 840 or other computing systems via network 702. Although not depicted, network interface 832 may include additional software, such as device drivers, additional hardware and other controllers that enable communication. When implemented as a server, computer system 800 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 702, and network 702 may use electrical, electromagnetic, or optical signals that carry digital data streams. The signals through the various networks and the signals on network 702, the network link to network 702, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

Figures 9, 10:
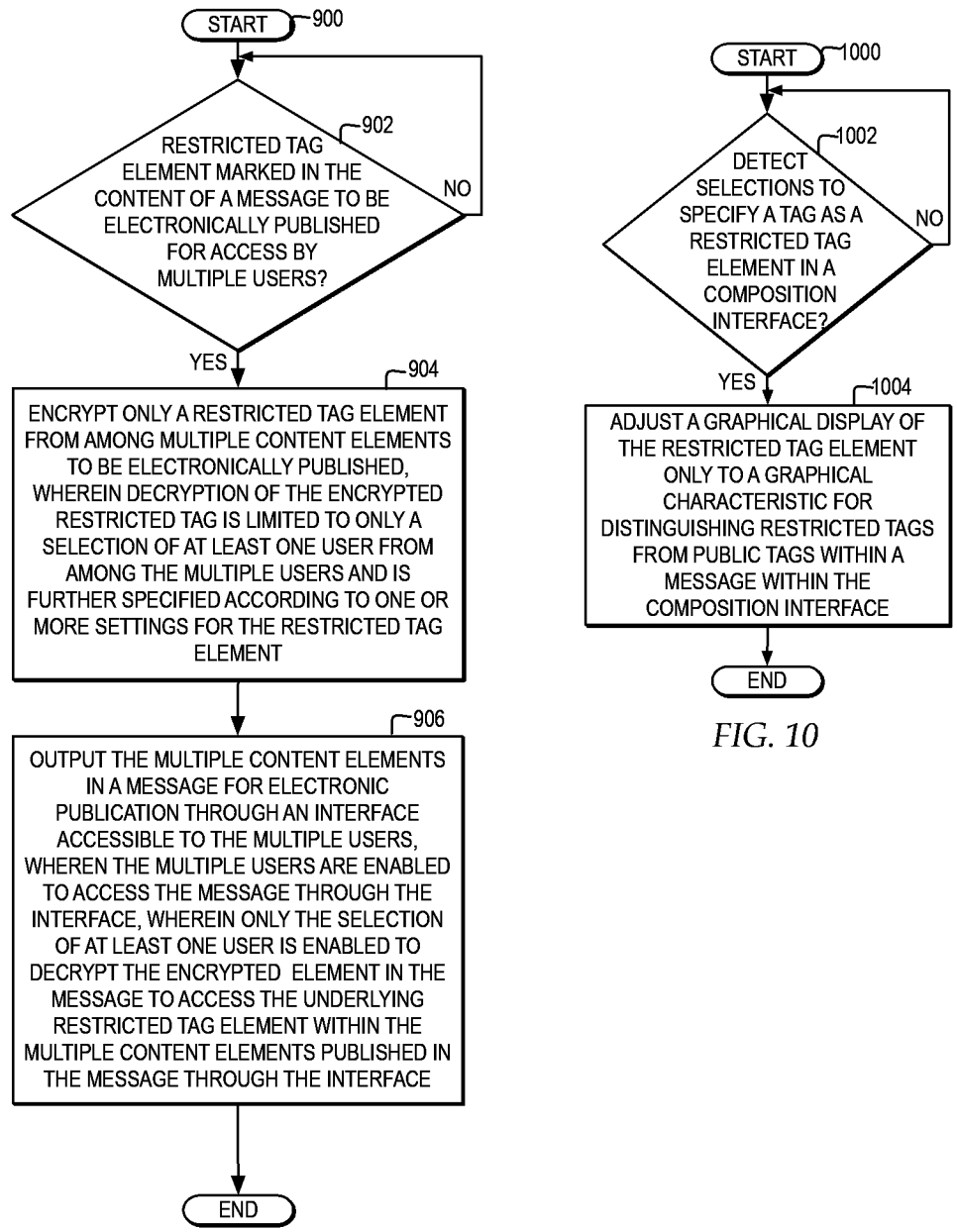
FIG. 9 is a high level logic flowchart illustrating one example of a process and program for managing restricted tagged elements within published message content.
FIG. 10 is a high level logic flowchart illustrating one example of a process and program for managing a display of a restricted tag element within a message in the message composition interface.

FIG. 9 illustrates one example of a high level logic flowchart of a process and program for managing restricted tagged elements within published message content. In the example, the process and program starts at block 900 and thereafter proceeds to block 902. In one example, one or more steps of the process and program performed in FIG. 9 may be performed by one or more of access controller 128 and publication service 102, which may be performed through one or more of publication service composer interface 412, composer access controller 420, publication service distribution interface 432, and restricted tag access controller 442. Block 902 illustrates a determination whether a restricted tag element marked in the content of a message to be electronically published for access by multiple users. At block 902, if a restricted tag element is marked in the content of a message to be electronically published for access by multiple users, then the process passes to block 904. Block 904 illustrates encrypting only a restricted tag element from among multiple content elements to be electronically published, wherein decryption of the encrypted restricted tag is limited to only a selection of at least one user from among the multiple users and is further specified according to one or more settings for the restricted tag element. In one example, the restricted tag element is encrypted to limit decryption to only a selection of at least one user from among the multiple users by using one or more public keys of the at least one user to encrypt the restricted tag element, wherein only the corresponding private key held by each at least one user will decrypt elements encrypted with a corresponding public key available for each at least one user. Next, block 906 illustrates outputting the multiple content elements in a message for electronic publication through an interface accessible to the multiple users, wherein the multiple users are enabled to access the message through the interface, wherein only the selection of at least one user is enabled to decrypt the encrypted element in the message to access the underlying restricted tag element within the multiple content elements published in the message through the interface, and the process ends.

FIG. 10 illustrates one example of a high level logic flowchart of a process and program for managing a display of a restricted tag element within a message in the message composition interface. In one example, the process starts at block 1000 and thereafter proceeds to block 1002. In one example, one or more steps of the process and program performed in FIG. 10 may be performed by one or more of access controller 128 and publication service 102, which may be performed by one or more of publication service composer interface 412 and publication service distribution interface 432. Block 1002 illustrates a determination whether a controller detects selections, whether through textual entries or interface selections, to specify a tag as a restricted tag element in a composition interface. At block 1002, if a controller detects selections to specify a tag as a restricted tag element within a composition interface, then the process passes to block 1004. Block 1004 illustrates adjusting a graphical display of the restricted tag element only to a graphical characteristic for distinguishing restricted tag elements from public elements within a message within the composition interface and the process ends.

Figure 11:
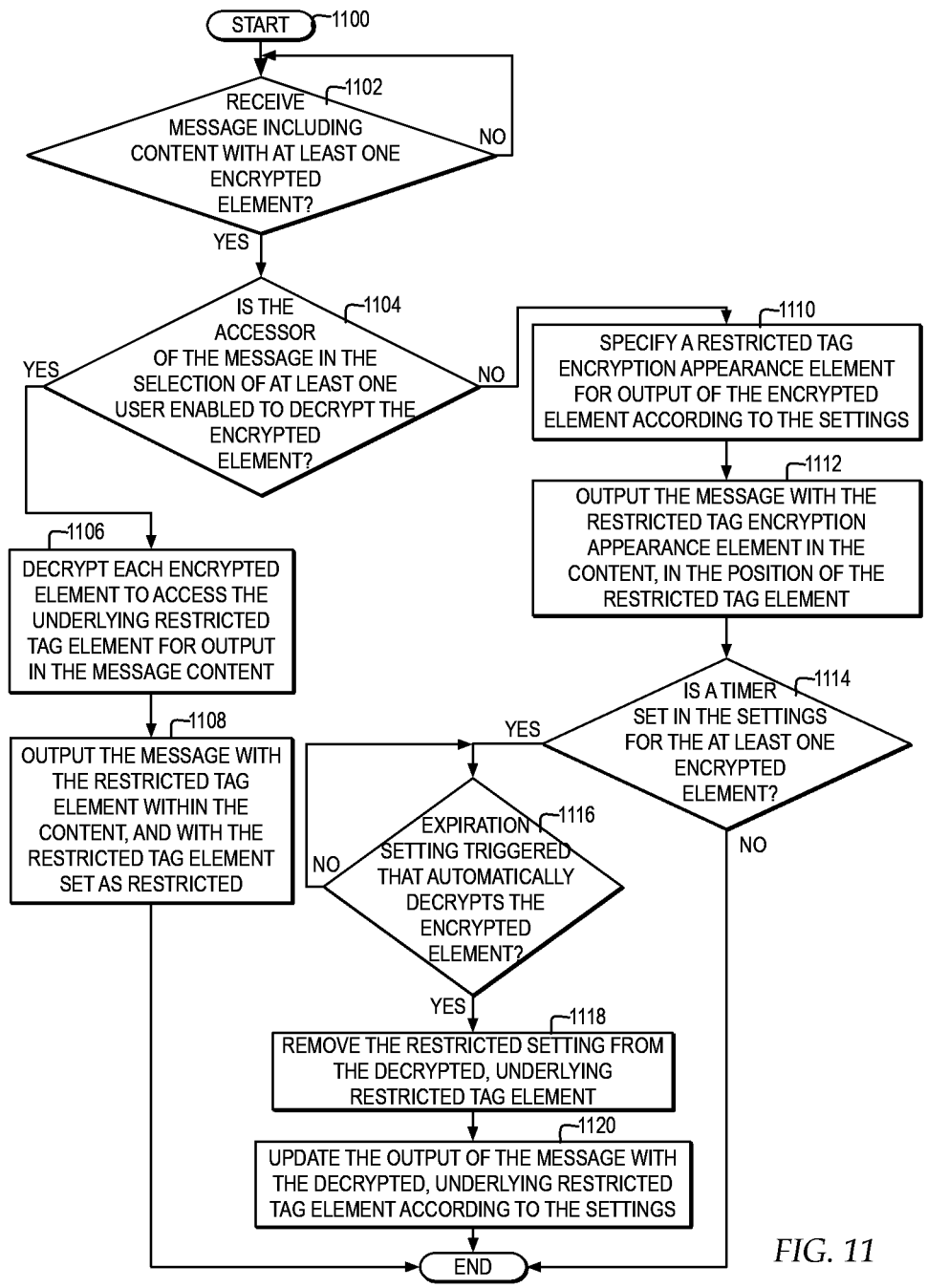
FIG. 11 is a high level logic flowchart illustrating one example of a process and program for managing access to messages with encrypted restricted tag elements.

FIG. 11 illustrates one example of a high level logic flowchart of a process and program for managing access to messages with encrypted restricted tag elements. In the example, the process starts at block 1100 and thereafter proceeds to block 1102. In one example, one or more steps of the process and program performed in FIG. 11 may be performed by one or more of access controller 128 and publication service 102, which may be performed by one or more of publication service distribution interface 432, restricted tag access controller 442, publication service access interface 452, and composer access controller 460. Block 1102 illustrates a determination whether a message including content with at least one encrypted element is received. At block 1102, if a message including content with at least one encrypted element is received, then the process passes to block 1104. Block 1104 illustrates a determination whether the accessor of the message is included in the selection of at least one user enabled to decrypt the encrypted element. In one example, a determination whether the accessor of the message is included in the selection of at least one user enabled to decrypt the encrypted element, a determination is made whether a private key held by the accessor is enabled to decrypted the encrypted element.

At block 1104, if the accessor of the message is within the selection of at least one user enabled to decrypt the encrypted element, then the process passes to block 1106. Block 1106 illustrates decrypting each encrypted element to access the underlying restricted tag element for output in the message content. In one example, the encrypted element is decrypted using the accessor's private key. Next, block 1108 illustrates outputting the message with the restricted tag element within the content and with the restricted tag element set as restricted, and the process ends.

Returning to block 1104, if the accessor of the message is not within the selection of least one user enabled to decrypt the encrypted element, then the process passes to block 1110. Block 1110 illustrates specifying a restricted tag encryption appearance element for output of the encrypted element according to the settings. Next, block 1112 illustrates outputting the message with the restricted tag encryption appearance element in the content, in the position of the restricted tag element. Next, block 1114 illustrates a determination whether a timer is set in the settings for the at least one encrypted element. At block 1114, if there is not a timer set, then the process ends. At block 1116, if there is a timer set, then the process passes to block 1116. Block 1116 illustrates a determination whether the expiration setting is triggered that automatically decrypts the encrypted element. At block 1116, if the expiration setting is triggered, then the process passes to block 1118. Block 1118 illustrates restricted setting from the decrypted, underlying restricted tag element. Next, block 1120 illustrates updating the output of the message with the decrypted, underlying restricted tag element, according to the settings, and the process ends.

Figure 12:
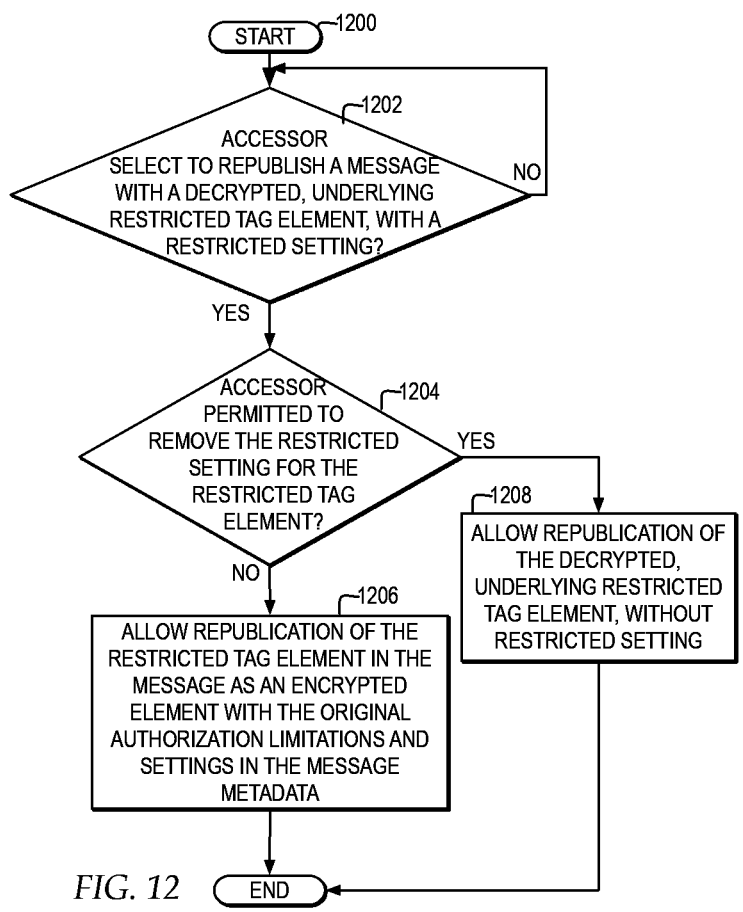
FIG. 12 is a high level logic flowchart illustrating one example of a process and program for managing republication of messages with restricted tag elements.

FIG. 12 illustrates one example of a high level logic flowchart of a process and program for managing republication of messages with restricted tag elements. In the example, the process starts at block 1200 and thereafter proceeds to block 1202. In one example, one or more steps of the process and program performed in FIG. 12 may be performed by one or more of access controller 128 and publication service 102, which may be performed by one or more of publication service distribution interface 432, restricted tag access controller 442, publication service access interface 452, and composer access controller 460. Block 1202 illustrates a determination whether an accessor of a message selects to republish the message that includes a decrypted, restricted tag element marked as restricted.

At block 1202, if an accessor selects to republish a message with a decrypted, restricted tag element, marked as restricted, then the process passes to block 1204. Block 1204 illustrates a determination whether the accessor is permitted to remove the restricted setting for the restricted tag element, according to the settings for the restricted tag element.

At block 1204, if the accessor is not permitted to remove the restricted tag setting for the restricted tag element, then the process passes to block 1206. Block 1206 illustrates allowing republication of the restricted tag element in the message as the encrypted element with the authorization limitations and settings specified for the restricted tag element in the message metadata, and the process ends.

At block 1204, if the accessor is permitted to remove the restricted tag setting for the restricted tag element, then the process passes to block 1208. Block 1208 illustrates allowing republication of the decrypted, underlying restricted tag element, without restricted setting, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for managing content publication, comprising:

an encryption controller encrypting only a restricted tag element from among a plurality of content elements to be electronically published as a message for access by a plurality of users, wherein decryption of the encrypted restricted tag element is limited to a selection of at least one user from among the plurality of users;

outputting the plurality of content elements for electronic publication through a publication service access interface accessible to the plurality of users, wherein the plurality of users are enabled to access the plurality of content elements of the message published through the publication service access interface, wherein only the selection of at least one user is enabled to decrypt the encrypted restricted tag element in the plurality of content elements to access the underlying restricted tag element within the message published through the publication service access interface;

identifying within a message composition interface a particular element within the plurality of content elements as the restricted tag element by a user selecting a selectable option using a restricted tag selection interface to mark a particular content element as a restricted tag; and adjusting within the message composition interface at least one graphical output characteristic of the particular element to graphically distinguish the particular element from the other elements within the plurality of content elements within the published message.

2. The method according to claim 1, further comprising:

identifying a particular element within the plurality of content elements as the restricted tag element through the restricted tag selection interface by identifying a text phrase preceded by a first text symbol identifying the text phrase as a tag and preceded by a second text symbol identifying the metadata tag as the restricted tag.

3. The method according to claim 1, wherein outputting the plurality of content elements for electronic publication through the publication service access interface accessible to the plurality of users, wherein the plurality of users are enabled to access the plurality of content elements of the message published through the publication service access interface, wherein only the selection of at least one user is enabled to decrypt the encrypted restricted tag element in the plurality of content elements to access the underlying restricted tag element within the plurality of content elements published through the publication service access interface, further comprises:

outputting the plurality of content elements for electronic publication with the encrypted restricted tag element specified to output as a restricted tag encryption appearance element comprising a textual element other than the underlying restricted tag element.

4. The method according to claim 3, wherein outputting the plurality of content elements for electronic publication with the encrypted restricted tag element specified to output as a restricted tag encryption appearance element comprising a textual element other than the underlying restricted tag element further comprises:

the restricted tag selection interface specifying the restricted tag encryption appearance element to comprise, for each separate instance of a same underlying restricted tag element in a separate message from among a plurality of messages comprising the same underlying restricted tag element, at least one alphanumeric within the textual element randomly selected, such that the textual element specified for the restricted tag encryption appearance element is different for each separate instance of the same underlying restricted tag element in each separate message from among the plurality of messages.

5. The method according to claim 1, wherein encrypting only a restricted tag element from among a plurality of content elements to be electronically published as a message for access by a plurality of users, wherein decryption of the encrypted restricted tag element is limited to a selection of at least one user from among the plurality of users, further comprises:

the encryption controller encrypting the restricted tag element as the encrypted restricted tag element, with a timer set to automatically decrypt the encrypted restricted tag element after an expiration setting is triggered.

6. The method according to claim 1, further comprising:

controlling a message composition interface through which a user may compose the message comprising the plurality of content elements, wherein the plurality of content elements comprise a particular element specified as the restricted tag element and at least one other element not specified as the restricted tag element.

7. The method according to claim 1, wherein encrypting only a restricted tag element from among a plurality of content elements to be electronically published as a message for access by a plurality of users, wherein decryption of the encrypted restricted tag element is limited to a selection of at least one user from among the plurality of users, further comprises:

the encryption controller encrypting only the restricted tag element comprising a promotion code distributed by a promotion service in a message to the plurality of users, wherein the promotion service specifies the selection of at least one user from a plurality of registered users of the promotion service, wherein the promotion service provides an a promotion interface through which an accessor of the promotion code from among the plurality of registered users enabled to decrypt the encrypted restricted tag element to access the underlying restricted tag element comprising the promotion code enters the promotion code to receive a particular service only accessible with entry of the promotion code.

8. The method according to claim 1, wherein encrypting, by a computer, only a restricted tag element from among a plurality of content elements to be electronically published as a message for access by a plurality of users, wherein decryption of the encrypted restricted tag element is limited to a selection of at least one user from among the plurality of users, further comprises:

the encryption controller encrypting only the restricted tag element comprising a particular hashtag distributed by a content aggregator service to the user composing the message, wherein the user composing the message specifies the at least one other user comprising an identifier for the content aggregator service, such that only the content aggregator service is enabled to decrypt the encrypted restricted tag element and identify the message as comprising the particular hashtag.

9. A system for managing content publication, comprising:
one or more processors;
a memory coupled to at least one of the processors;
a set of computer program instructions stored in the memory and executed by at least one of the processors in order to perform the actions of:
an encryption controller encrypting only a restricted tag element from among a plurality of content elements to be electronically published as a message for access by a plurality of users, wherein decryption of the encrypted restricted tag element is limited to a selection of at least one user from among the plurality of users;
outputting the plurality of content elements for electronic publication through a publication service access interface accessible to the plurality of users, wherein the plurality of users are enabled to access the plurality of content elements of the message published through the publication service access interface, wherein only the selection of at least one user is enabled to decrypt the encrypted restricted tag element in the plurality of content elements to access the underlying restricted tag element within the message published through the publication service access interface;
identifying within a message composition interface a particular element within the plurality of content elements as the restricted tag element by a user selecting a selectable option using a restricted tag selection interface to mark a particular content element as a restricted tag; and
adjusting within the message composition interface at least one graphical output characteristic of the particular element to graphically distinguish the particular element from the other elements within the plurality of content elements within the published message.

10. The system according to claim 9, wherein the processors perform additional actions comprising:
identifying a particular element within the plurality of content elements as the restricted tag element through the restricted tag selection interface by identifying a text phrase preceded by a first text symbol identifying the text phrase as a tag and preceded by a second text symbol identifying the metadata tag as the restricted tag.

11. The system according to claim 9, wherein the processors perform additional actions comprising:
outputting the plurality of content elements for electronic publication with the encrypted restricted tag element specified to output as a restricted tag encryption appearance element comprising a textual element other than the underlying restricted tag element.

12. The system according to claim 9, wherein the processors perform additional actions comprising:
encrypting the restricted tag element as the encrypted restricted tag element, with a timer set to automatically decrypt the encrypted restricted tag element after an expiration setting is triggered.

13. The system according to claim 9, wherein the processors perform additional actions comprising:
controlling a message composition interface through which a user may compose the message comprising the plurality of content elements, wherein the plurality of content elements comprise a particular element specified as the restricted tag element and at least one other element not specified as the restricted tag element.

14. The system according to claim 9, wherein the processors perform additional actions comprising:
the encryption controller encrypting only the restricted tag element comprising a promotion code distributed by a promotion service in a message to the plurality of users, wherein the promotion service specifies the selection of at least one user from a plurality of registered users of the promotion service, wherein the promotion service provides a promotion interface through which an accessor of the promotion code from among the plurality of registered users enabled to decrypt the encrypted restricted tag element to access the underlying restricted tag element comprising the promotion code enters the promotion code to receive a particular service only accessible with entry of the promotion code.

15. The system according to claim 9, wherein the processors perform additional actions comprising:
the encryption controller encrypting only the restricted tag element comprising a particular hashtag distributed by a content aggregator service to the user composing the message, wherein the user composing the message specifies the at least one other user comprising an identifier for the content aggregator service, such that only the content aggregator service is enabled to decrypt the encrypted restricted tag element and identify the message as comprising the particular hashtag.

16. A computer program product for managing content publication, the computer program product comprising a computer readable storage medium having program code embodied therewith, the program code executable by a computer to:
an encryption controller encrypting only a restricted tag element from among a plurality of content elements to be electronically published as a message for access by a plurality of users, wherein decryption of the encrypted restricted tag element is limited to a selection of at least one user from among the plurality of users;
outputting the plurality of content elements for electronic publication through a publication service access interface accessible to the plurality of users, wherein the plurality of users are enabled to access the plurality of content elements of the message published through the publication service access interface, wherein only the selection of at least one user is enabled to decrypt the encrypted restricted tag element in the plurality of content elements to access the underlying restricted tag element within the message published through the publication service access interface;
identifying within a message composition interface a particular element within the plurality of content elements as the restricted tag element by a user selecting a selectable option using a restricted tag selection interface to mark a particular content element as a restricted tag; and
adjusting within the message composition interface at least one graphical output characteristic of the particular element to graphically distinguish the particular element from the other elements within the plurality of content elements within the published message.

* * * * *